United States Patent [19]
Wakamiya et al.

[11] Patent Number: 5,611,047
[45] Date of Patent: Mar. 11, 1997

[54] INFORMATION DELIVERY METHOD AND APPARATUS FOR SUCCESSIVELY TRANSFERRING INFORMATION EVEN IF THE STORAGE UNIT HAS INSUFFICIENT SPACE FOR STORING INFORMATION FROM AN UPSTREAM APPARATUS

[75] Inventors: Kenji Wakamiya; Osamu Saito, both of Kawasaki, Japan

[73] Assignee: Fujitsu Ltd., Kawasaki, Japan

[21] Appl. No.: 281,669

[22] Filed: Jul. 29, 1994

[30] Foreign Application Priority Data

Nov. 19, 1993 [JP] Japan .................................. 5-314493

[51] Int. Cl.⁶ ..................................................... G06F 13/00
[52] U.S. Cl. .................. 395/200.01; 395/877; 395/872; 395/181; 371/32
[58] Field of Search ....................... 395/837, 849, 395/877, 200.01, 600; 364/200, 900; 371/32; 370/60.1; 358/86; 348/7

[56] References Cited

U.S. PATENT DOCUMENTS

| | | | |
|---|---|---|---|
| 4,380,052 | 4/1983 | Shima | 364/900 |
| 4,630,196 | 12/1986 | Bednar, Jr. et al. | 364/200 |
| 4,723,120 | 2/1988 | Petty, Jr. | 340/825.02 |
| 4,759,015 | 7/1988 | Takai et al. | 370/86 |
| 4,833,605 | 5/1989 | Terada et al. | 364/200 |
| 4,845,658 | 7/1989 | Gifford | 364/900 |
| 4,852,043 | 7/1989 | Guest | 364/900 |
| 4,881,164 | 11/1989 | Hailpern et al. | 364/200 |
| 4,914,625 | 4/1990 | Billian | 364/900 |
| 4,958,341 | 9/1990 | Hemmady et al. | 370/60.1 |
| 5,036,518 | 7/1991 | Tseung | 371/32 |
| 5,109,384 | 4/1992 | Tseung | 371/32 |
| 5,115,235 | 5/1992 | Oliver | 340/825.52 |
| 5,117,494 | 5/1992 | Costes et al. | 395/575 |
| 5,220,420 | 7/1993 | Hoarty et al. | 358/86 |
| 5,285,448 | 2/1994 | Nakayama et al. | 370/85.15 |
| 5,345,558 | 9/1994 | Opher et al. | 395/200 |
| 5,349,343 | 9/1994 | Oliver | 340/825.52 |
| 5,371,532 | 12/1994 | Gelman et al. | 348/7 |
| 5,432,907 | 7/1995 | Picazo, Jr. et al. | 395/200 |
| 5,455,944 | 10/1995 | Haderle et al. | 395/600 |

*Primary Examiner*—Thomas C. Lee
*Assistant Examiner*—Duo Chen
*Attorney, Agent, or Firm*—Staas & Halsey

[57] ABSTRACT

An information delivery apparatus to be employed within an information network system. A plurality of such apparatuses as part of an information network will successively store and deliver information throughout the network. Each apparatus can store information received from an upstream apparatus and relay that information to a downstream apparatus. If the apparatus has no space in its storage unit to store the information received from the upstream apparatus, the apparatus will record identification data of the information in a table of passed information and when the storage unit thereof has a free space to receive the information, will send a repeat request to the upstream apparatus containing the identification data of the information.

19 Claims, 9 Drawing Sheets

```
<WKENJI.93Feb9101326@einstein.center.flab.fujitsu.co.jp>
<KURODA.93Feb8210513@conan.center.flab.fujitsu.co.jp>
<MISAKO.93Feb8120109@conan.center.flab.fujitsu.co.jp>
<NARA.93Feb4084925@conan.ling.flab.fujitsu.co.jp>
<CEN125.93Jan1221273B@heartland.center.flab.fujitsu.co.jp>
           - - - - -
<KIKN.93Jan19174522@conan.FLAB.FUJITSU.CO.JP>
```

Fig. 8

Subject:Send Me
Control:sendme ****
Hopcount:1

<WKENJI.93Feb9101326@einstein.center.flab.fujitsu.co.jp>
<KURODA.93Feb8210513@conan.center.flab.fujitsu.co.jp>
<MISAKO.93Feb8120109@conan.center.flab.fujitsu.co.jp>
<NARA.93Feb4084925@conan.ling.flab.fujitsu.co.jp>
<CEN125.93Jan122127380@heartland.center.flab.fujitsu.co.jp>
- - - - -
<KIKN.93Jan19174522@conan.FLAB.FUJITSU.CO.JP>

INFORMATION DELIVERY METHOD AND APPARATUS FOR SUCCESSIVELY TRANSFERRING INFORMATION EVEN IF THE STORAGE UNIT HAS INSUFFICIENT SPACE FOR STORING INFORMATION FROM AN UPSTREAM APPARATUS

BACKGROUND OF THE INVENTION

1. Field of the Invention

The present invention relates to an information delivery system involving information delivery apparatuses that successively transfer and store information such as subscription news, and an information delivery method employed by the system.

2. Description of the Related Art

An information delivery system such as Internet involves many information delivery apparatuses that are connected to one another through a network. The system delivers information such as subscription news to the apparatuses through the network such that an upstream apparatus transfers the information to a downstream one until every apparatus receives and stores the information.

Figure 1:
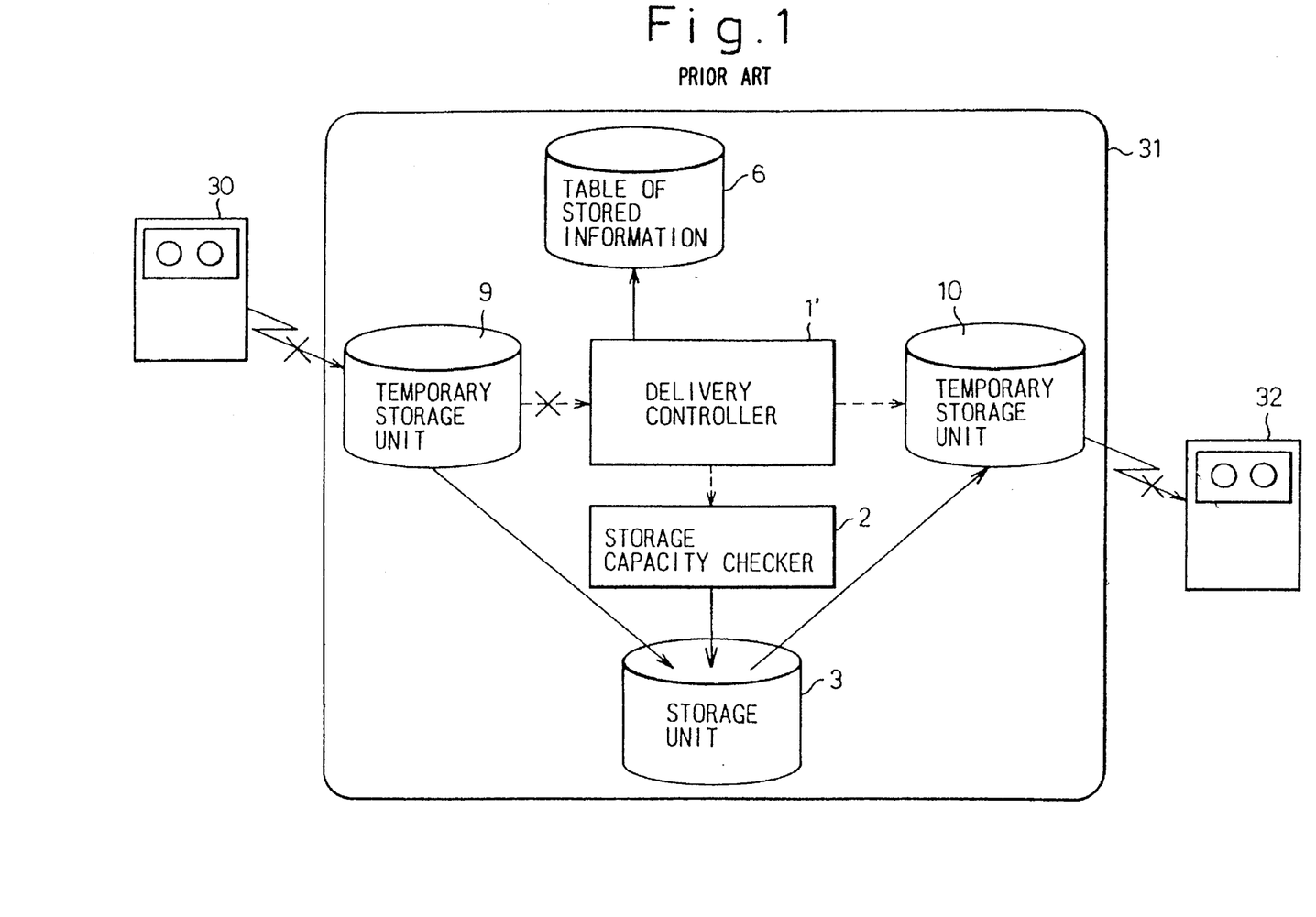
FIG. 1 shows an information delivery apparatus according to a prior art.

FIG. 1 is a block diagram showing a conventional information network system. This system involves three information delivery apparatuses 30, 31, and 32 through which information is successively transferred. In particular, the figure shows the details of the intermediate apparatus 31, which is downstream to the apparatus 30 and upstream to the apparatus 32. The apparatuses 30, 31, and 32 have the same configuration.

The apparatus 31 has a delivery controller 1' for receiving information from the upstream apparatus 30 and sending the information to the downstream apparatus 32, a storage unit 3 for storing the information, a storage capacity checker 2 for determining if the storage unit 3 has free space of a predetermined volume, a table 6 for recording the identification data (ID) of information stored in the storage unit 3, a temporary storage unit 9 for temporarily storing information sent from the upstream apparatus 30, and a temporary storage unit 10 for temporarily storing information to be sent to the downstream apparatus 32.

The operation of the system will be explained. In the apparatus 31, the storage capacity checker 2 checks to see if there is free space in the storage unit 3 and passes the result of the check to the upstream apparatus 30. If the free space in the storage unit 3 of the apparatus 31 is below a predetermined volume, the upstream apparatus 30 sends no information to the apparatus 31 and waits until the storage unit 3 of the apparatus 31 has the predetermined free space. The apparatus 31 updates the contents of the storage unit 3 and if the predetermined free space is available in the storage unit 3, the upstream apparatus 30 sends the information to the apparatus 31.

In this system, a network link between the apparatuses 30 and 31 is not used until the storage unit 3 of the apparatus 31 has the predetermined free space. This deteriorates the efficiency of use of the network.

Even if the storage unit 3 of the downstream apparatus 32 has a free space to receive the information, the information will not be transferred to the apparatus 32 because the apparatus 31, which is upstream the apparatus 32, has no space to receive the information. The presence of the apparatus 31 having the insufficient free space causes a delay in transferring the information to the downstream apparatus 32.

SUMMARY OF THE INVENTION

An object of the present invention is to provide an information delivery system such as an information network system that smoothly delivers information through information delivery apparatuses even if some of the apparatuses have no space to store the information.

Another object of the present invention is to provide an information delivery system for smoothly delivering information through information delivery apparatuses, to improve the efficiency of use of network links and minimize an information transfer delay.

In order to accomplish the objects, the present invention provides an information delivery system employing information delivery apparatuses each being capable of transferring information from an upstream apparatus to a downstream apparatus even if the apparatus in question has no space to store the information. Accordingly, the information is quickly and successively transferred through the apparatuses and not kept in the apparatus in question.

In each of the information delivery apparatuses, a delivery controller transfers information from an upstream apparatus to a downstream apparatus. A storage capacity checker determines whether or not a storage unit of the apparatus has a space to store the information. If it has the space, the information is stored in the storage unit. If it has no space, the information is not stored in the storage unit but only the identification data of the delivered information are recorded in a table of passed information.

Once the storage capacity checker finds free space of a predetermined volume in the storage unit, a repeat request unit sends a repeat request message to the upstream apparatus, to ask the upstream apparatus to again send the information corresponding to the identification data recorded in the table of passed information.

In the apparatus that has received the repeat request message from the downstream apparatus, a repeat request processing unit checks a table of stored information to see if the requested information is in a storage unit. If there is, the information is picked out of the storage unit and transferred to the downstream apparatus, and if not, the apparatus transfers the repeat request message to an upstream apparatus.

The repeat request message may be sent to a downstream apparatus instead of the upstream apparatus, to receive the requested information from the downstream apparatus.

BRIEF DESCRIPTION OF THE DRAWINGS

The above objects and features of the present invention will be more apparent from the following description of the preferred embodiment with reference to the accompanying drawings, wherein:

FIGS. 9 and 10 explain the reason why the apparatus of FIG. 3 employs a hop counter, in which

DESCRIPTION OF THE PREFERRED EMBODIMENTS

Figure 2:
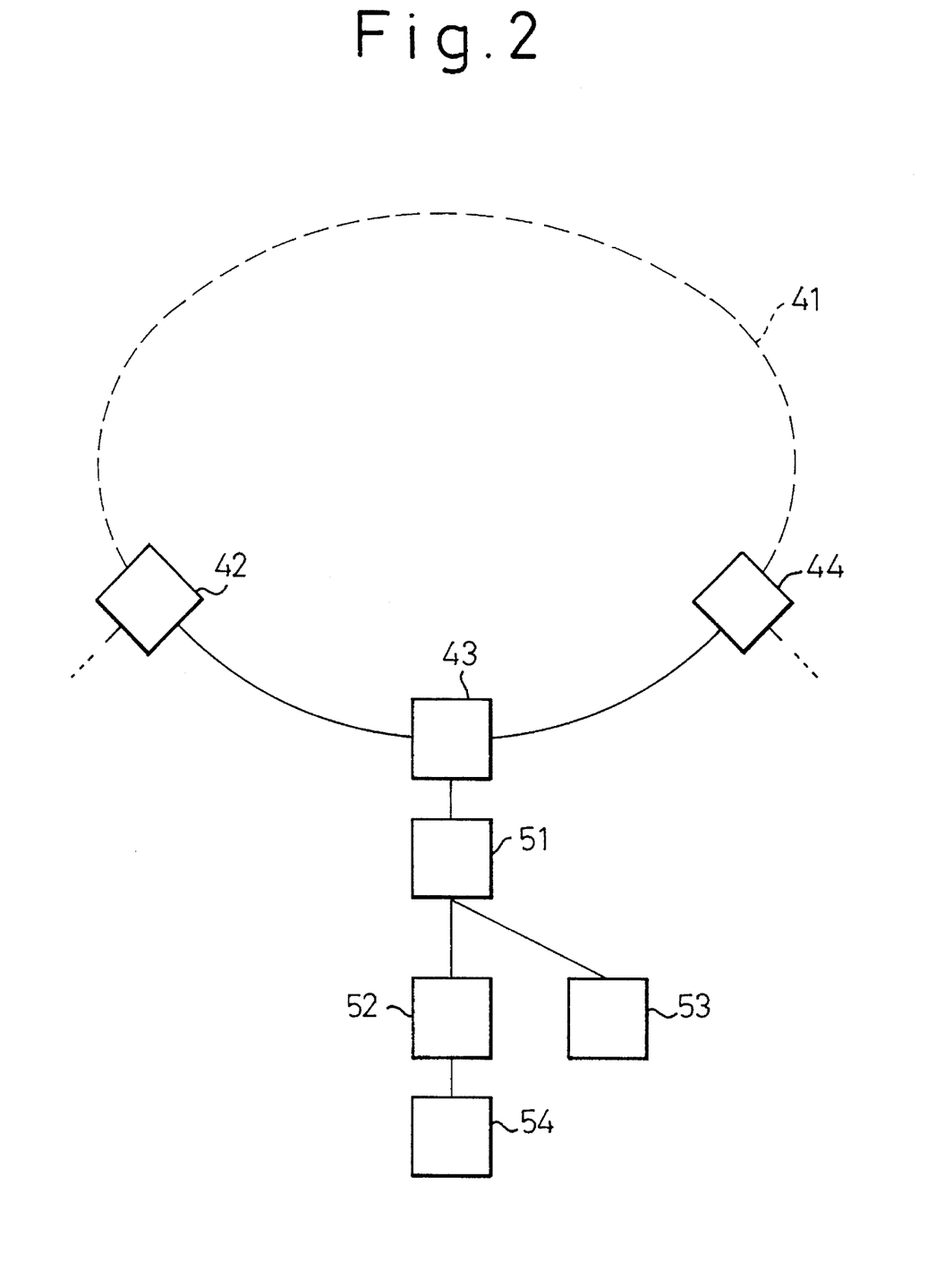
FIG. 2 shows an information delivery system.

FIG. 2 shows an information delivery system according to an embodiment of the present invention. A network 41 connects information delivery apparatuses 42, 43, 44, and so on to one another. These apparatuses are called gateways. The gateway 43 is connected to information delivery apparatuses 51, 52, 53, and 54. The other gateways 42, 44, and so on are also connected to their own information delivery apparatuses.

The gateway 42, for example, transmits information to the gateways 43 and 44. The gateway 43 stores the information and transfers the information to the apparatus 51, which transfers the same to the apparatuses 52 and 53. In this way, the information is successively transferred to downstream apparatuses.

Figure 3:
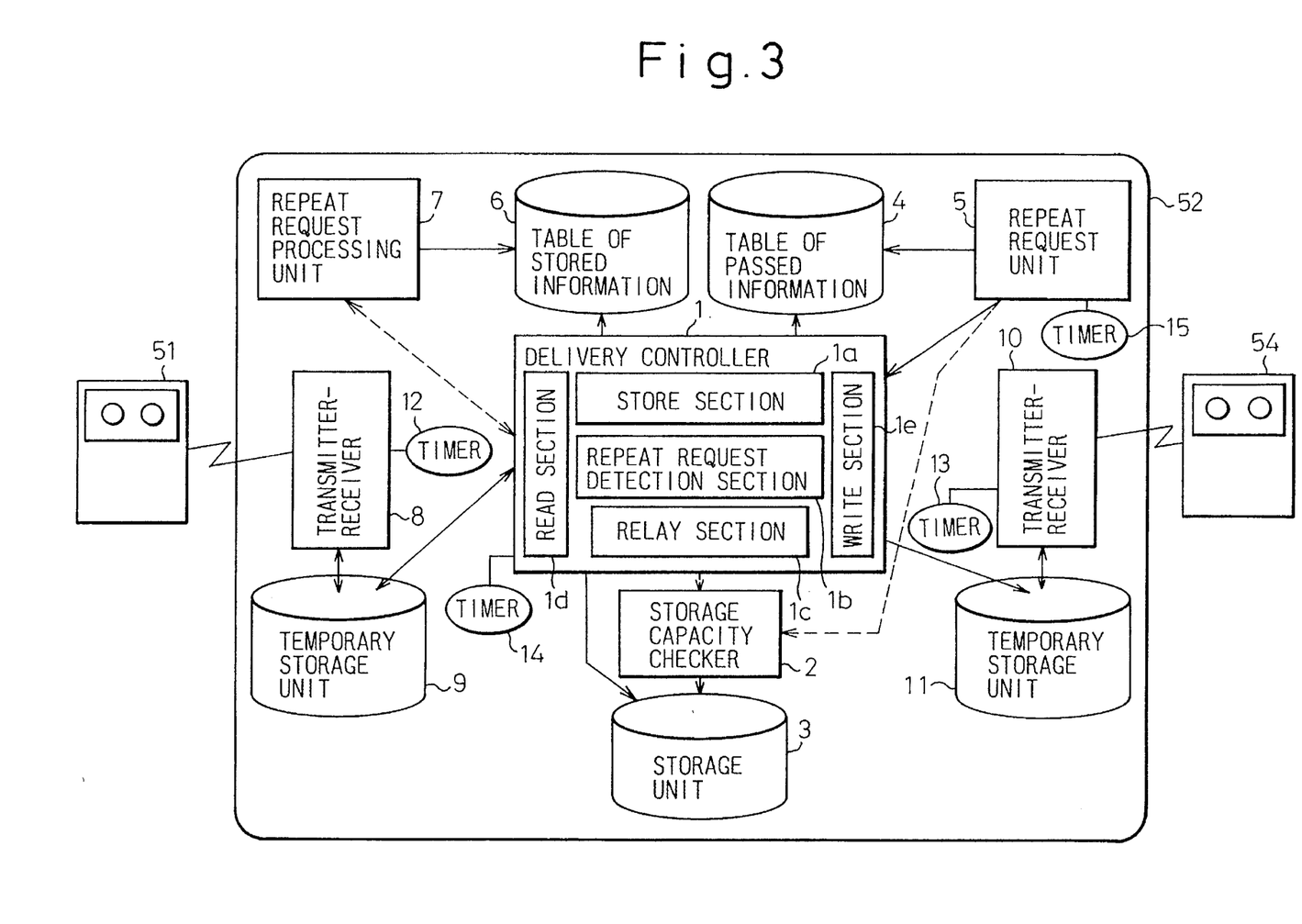
FIG. 3 shows an information delivery apparatus according to an embodiment of the present invention.

FIG. 3 shows the information delivery apparatuses 51, 52, and 54, in particular, the details of the apparatus 52. These apparatuses have the same configuration.

The apparatuses 51, 52, and 54 are formed in host computers, respectively. The apparatus 52 is connected to the upstream apparatus 51 and downstream apparatus 54. It is possible to connect a plurality of upstream and downstream apparatuses to each of these apparatuses.

The information delivery apparatus 52 will be explained.

A storage capacity checker 2 checks a storage unit 3 to see whether or not the storage unit 3 has a free space of predetermined volume.

The storage unit 3 is, for example, a magnetic disk unit and stores information transferred from the upstream apparatus 51. The information stored in the storage unit 3 is regularly updated. For example, it is updated once a day to delete old information.

A table 4 of passed information records the identification data of information that has not been stored in the storage unit 3.

A repeat request unit 5 refers to a result of the check by the storage capacity checker 2, and if the checker 2 finds that the storage unit 3 has a free space to receive information, examines the table 4 to see if there is any information passed through the apparatus while the storage unit 3 had no space to store the information. If there is passed information, the repeat request unit 5 prepares a repeat request message and sends it to the upstream apparatus 51. This message is a packet that contains a hop counter that is incremented by a repeat request processing unit 7 whenever the message is passed through one of the apparatuses.

A table 6 of stored information records the identification data for information stored in the storage unit 3. The table 6 may have the same format as the table 4 of passed information. The tables 4 and 6 must have at least the identification data for information.

Figure 7:
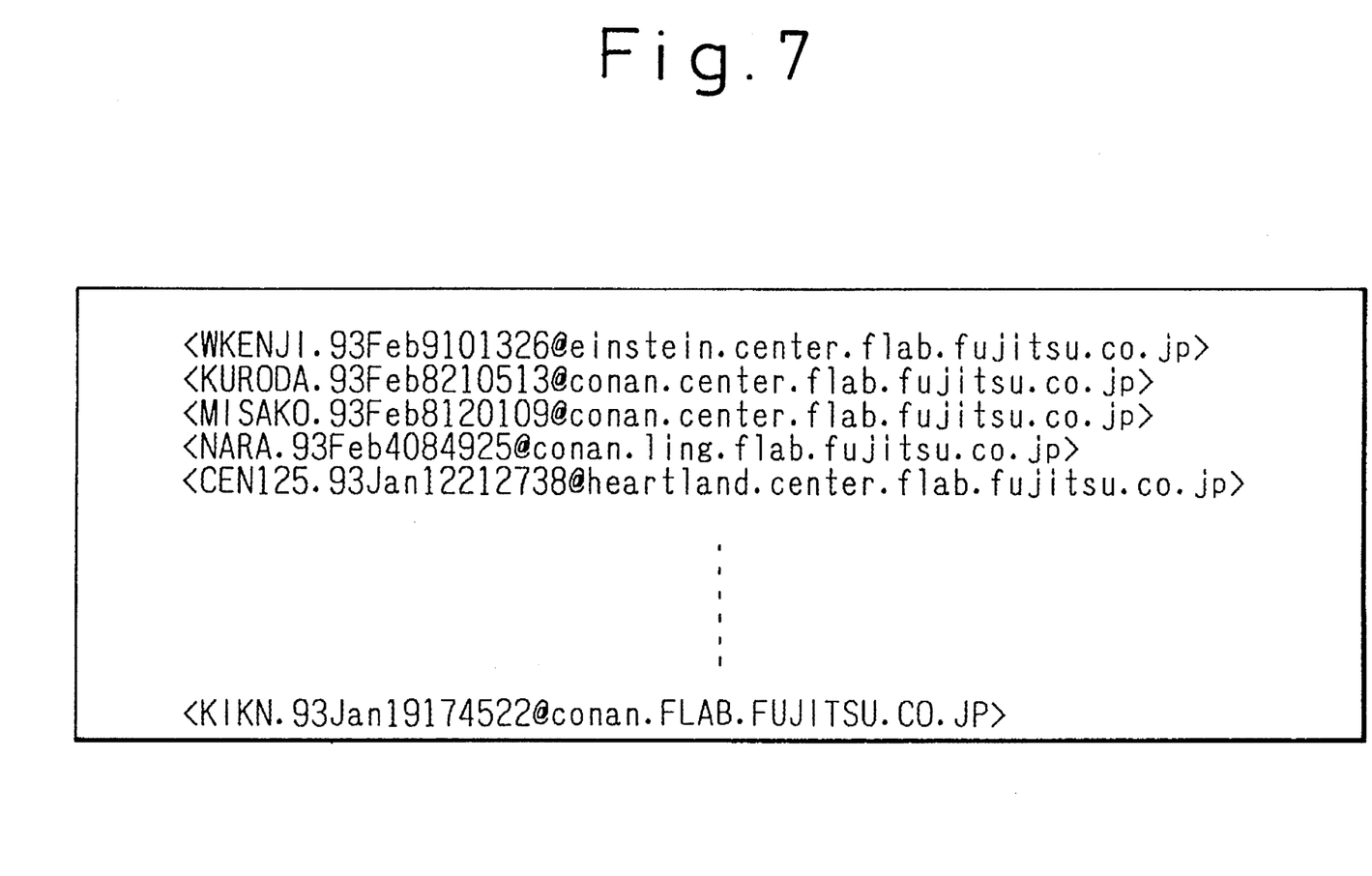
FIG. 7 shows an example of a table of stored information or a table of passed information in the apparatus of FIG. 3.

FIG. 7 shows an example of the table 6 of stored information, or the table 4 of passed information. Data within <> are identification data peculiar to the corresponding information.

Returning to FIG. 3, the downstream apparatus 54 may send a repeat request message to the apparatus 52. The delivery controller 1 of the apparatus 52 transfers the message to the repeat request processing unit 7. The processing unit 7 determines whether or not the identification data of the information requested by the repeat request message are recorded in the table 6 of stored information. If it is recorded, the processing unit 7 requests the delivery controller 1 to read the information out of the storage unit 3 and send it to the downstream apparatus 54. If the table 6 has no record of the identification data of the requested information and if the value of a hop counter in the repeat request message is equal to a limit value, the processing unit 7 ignores the message. If the value of the hop counter is below the limit value, the processing unit 7 increments the value by one and asks the delivery controller 1 to transfer the message to the upstream apparatus 51.

A transmitter-receiver 8 receives information from the upstream apparatus 51, or sends a repeat request message to the upstream apparatus 51. A temporary storage unit 9 is, for example, a magnetic disk unit for temporarily storing the information received by the transmitter-receiver 8, or the repeat request message to be sent from the transmitter-receiver 8. Another transmitter-receiver 10 transmits a copy of information stored in the storage unit 3 to the downstream apparatus 54, or receives a repeat request message from the downstream apparatus 54. A temporary storage unit 11 temporarily stores the repeat request message received by the transmitter-receiver 10, or the information to be sent from the transmitter-receiver 10.

In the above explanation, information is transferred from an upstream apparatus to a downstream apparatus, and a repeat request message is transferred from a downstream apparatus to an upstream apparatus. This may be reversible.

According to the embodiment, each of the temporary storage units 9 and 11 has a transmission dedicated area and a reception dedicated area. This prevents an event that the temporary storage unit is filled with received information and provides no space for information to be transmitted.

The delivery controller 1 has a store section 1a, a repeat request detection section 1b, a relay section 1c, a read section 1d, and a write section 1e. The read section 1d reads the contents of the reception area of any one of the temporary storage units 9 and 11. The repeat request detection section 1b extracts a repeat request message if the data read by the read section 1d includes a message. The store section 1a stores the information read by the read section 1d in the storage unit 3 if the storage unit 3 has free space. At the same time, the store section 1a transfers the information to the relay section 1c so that the identification data of the information is recorded in the table 6 of stored information. If the storage unit 3 has no space to receive the information, the store section 1a transfers the information to the relay section 1c so that the identification data of the information is recorded in the table 4 of passed information. The relay section 1c extracts information to be transferred to the downstream apparatus 54 out of the information transferred from the store section 1a, processes the extracted information, and transfers the processed information to the write section 1e. The write section 1e writes the information transferred from the relay section 1c or a repeat request message transferred from the repeat request unit 5 in the transmission area of the temporary storage unit 9 or 11.

The transmitter-receivers 8 and 10, delivery controller 1, and repeat request unit 5 have timers 12, 13, 14, and 15, respectively, and are activated at regular intervals according to the timers.

Figure 5:
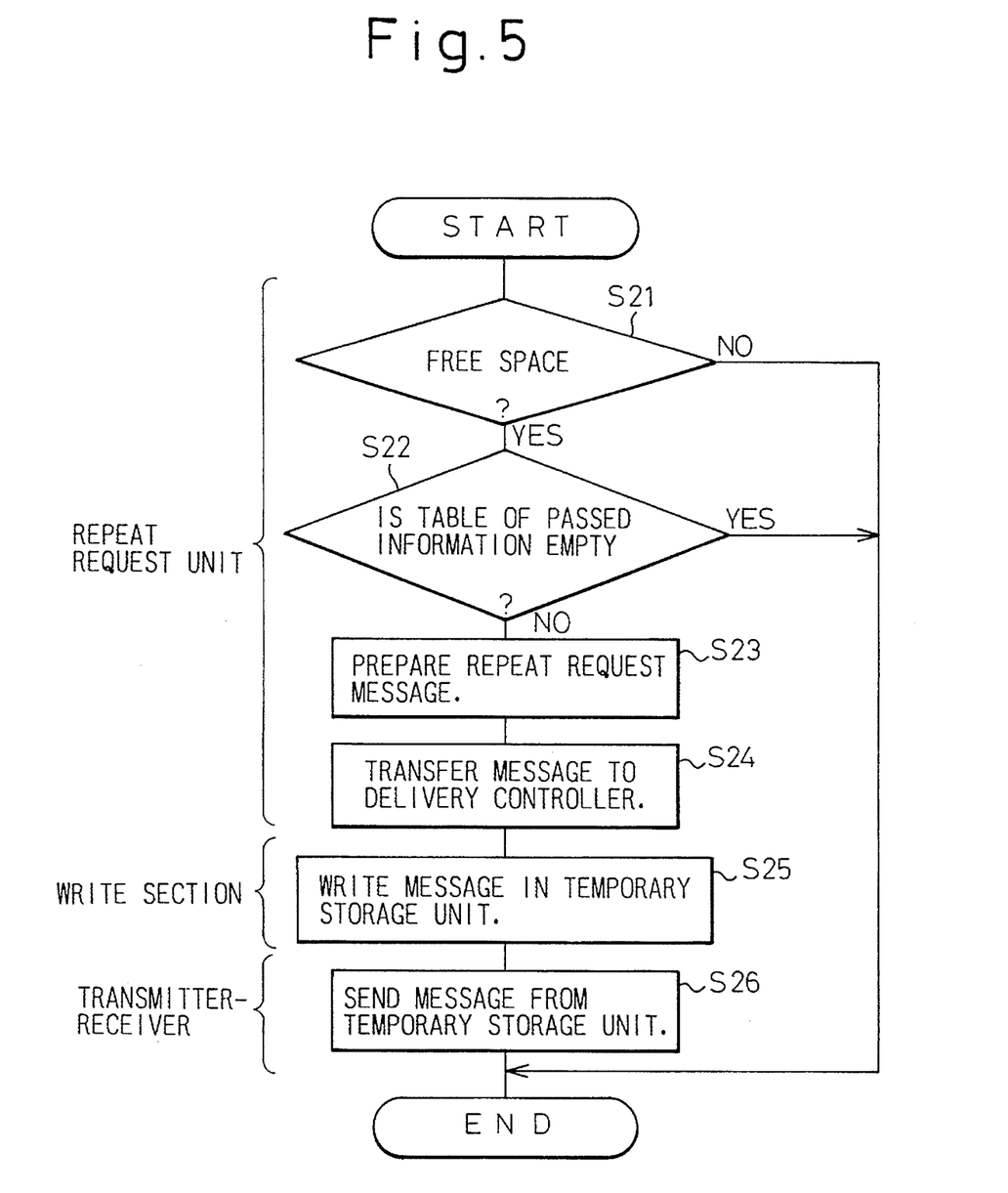
FIG. 5 shows steps of sending a repeat request carried out in the apparatus of FIG. 3.
Figure 6:
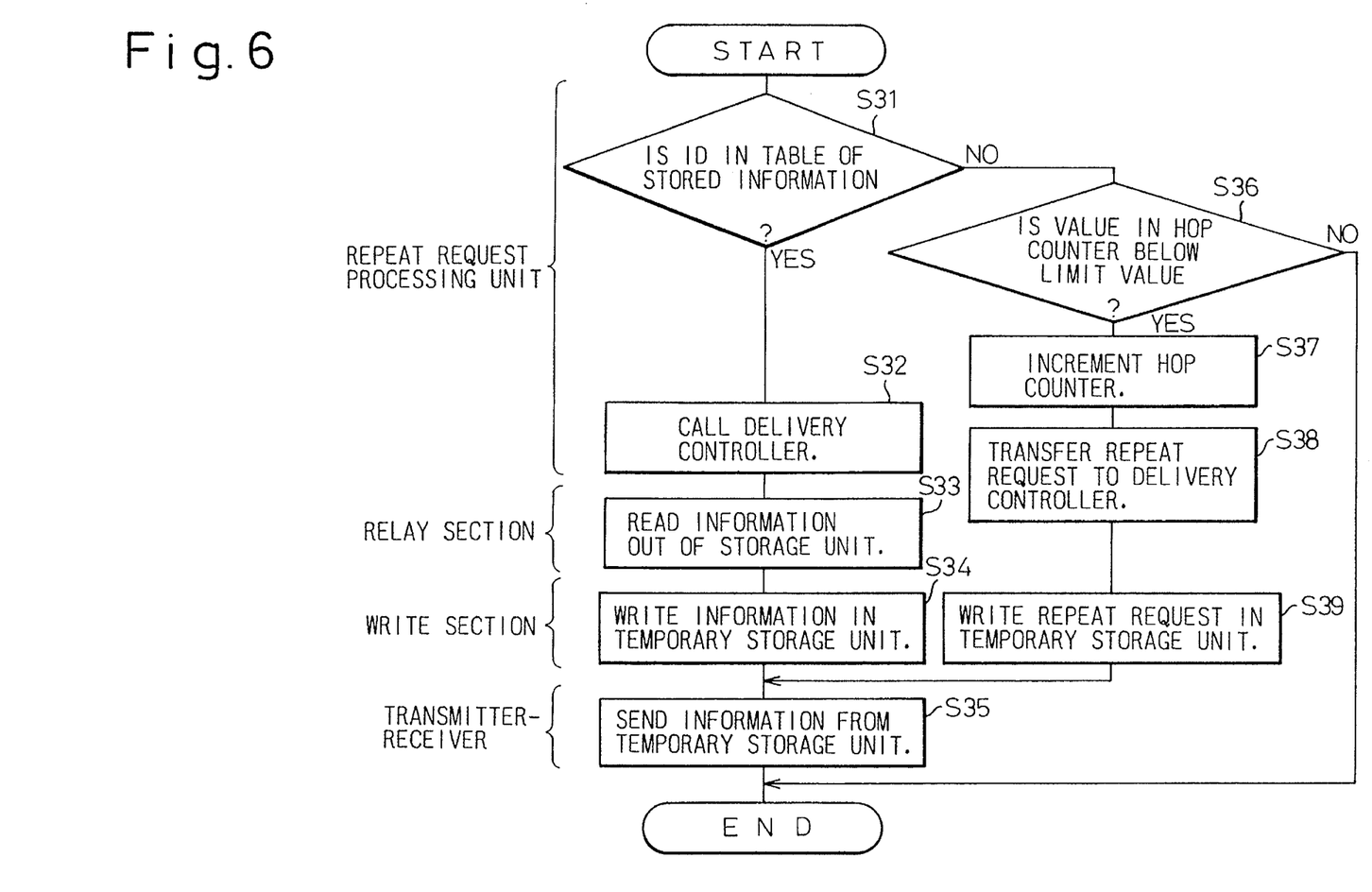
FIG. 6 shows steps of processing a repeat request carried out in the apparatus of FIG. 3.

The operation of the embodiment will be explained with reference to the flowcharts of FIGS. 4 to 6, in which FIG. 4 explains steps of transferring information, FIG. 5 explains steps of preparing a repeat request, and FIG. 6 explains steps of processing a repeat request.

The steps of transferring information will be explained with reference to FIG. 4.

In step S1, the transmitter-receiver 8 is regularly activated in response to the timer 12, to receive information from the upstream apparatus 51. The received information is stored in the reception area of the temporary storage unit 9.

In step S2, the delivery controller 1 is activated in response to the timer 14. The read section 1*d* reads the information out of the reception area of the temporary storage unit 9 and transfers it to the repeat request detection section 1*b*.

When the system is designed to transfer information only from an upstream apparatus to a downstream apparatus, the information never contains a repeat request message. When the system is designed to allow a downstream apparatus to transfer information to an upstream apparatus, an upstream apparatus may send a repeat request message to a downstream apparatus. If the information from the upstream apparatus 51 contains a repeat request message, the repeat request detection section 1*b* detects and transfers the message to the repeat request processing unit 7 in step S3. The step S3 will be explained later in detail with reference to FIG. 6.

In step S4, the store section 1*a* lets the storage capacity checker 2 check for free space in the storage unit 3. If the storage unit 3 has free space of a predetermined volume, step S5 stores the information in the storage unit 3, and step S6 records the identification data of the information in the table 6 of stored information. If the storage unit 3 has no space to store the information, step S7 records the identification data of the information in the table 4 of passed information.

Irrespective of whether or not the storage unit 3 has free space, the information from the upstream apparatus 51 is transferred to the relay section 1*c*. The relay section 1*c* determines in step S8 whether or not the information must be transferred to the downstream apparatus 54. If the information must be transferred to the downstream apparatus 54, the relay section 1*c* processes the information and transfers the processed information to the write section 1*e* in step S9. For example, the relay section 1*c* inserts the apparatus number of the apparatus 52 into the information, to clarify the apparatus that has transferred the information.

In step S10, the write section 1*e* stores the information in the transmission area of the temporary storage unit 11. In step S11, the transmitter-receiver 10 is activated in response to the timer 13 to transmit the information in the transmission area of the temporary storage unit 11 to the downstream apparatus 54.

If the reception area of the temporary storage unit 11 has information when the transmitter-receiver 10 is activated in response to the timer 13, the steps S1 through S11 mentioned above are carried out. The reception area of the temporary storage unit 11 usually holds only a repeat request message from the downstream apparatus 54. If the system is designed to allow a downstream apparatus to send information to an upstream apparatus, the reception area of the temporary storage unit 11 may hold information.

The steps of making a repeat request will be explained with reference to FIG. 5.

If the storage unit 3 of the apparatus 52 has no space to receive information from the upstream apparatus 51, the information is passed through the apparatus 52. Once the storage unit 3 has a free space, the apparatus 52 sends a repeat request message to the upstream apparatus 51 to ask the apparatus 51 to again send the information.

In step S21, the repeat request unit 5 is activated in response to the timer 15, to let the storage capacity checker 2 check a free space in the storage unit 3. If the storage unit 3 has no free space of a predetermined volume, the repeat request unit 5 terminates the operation because the storage unit 3 is unable to store information even if the upstream apparatus 51 again sends the information to the apparatus 52.

If the storage unit 3 has space to receive information, step S22 refers to the table 4 of passed information to see whether or not the table 4 has any record of information that has not been stored in the storage unit 3. If the table 4 has some record of such information, step S23 prepares a repeat request message embedding the identification data of the information to be received from the upstream apparatus 51. Step S24 transfers the message to the delivery controller 1. At this time, a hop counter in the message is initialized to 1.

Figure 8:
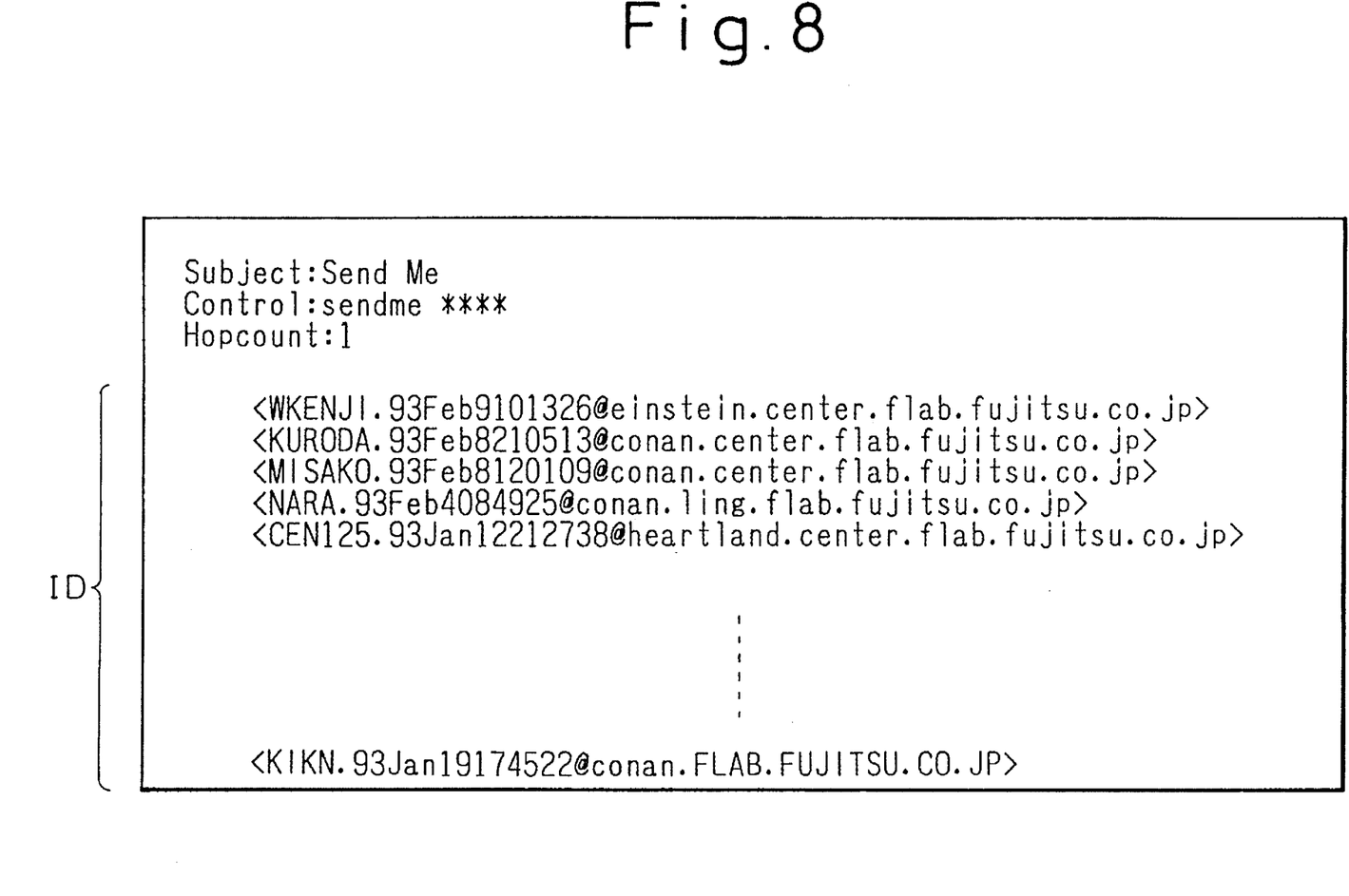
FIG. 8 shows an example of a repeat request message prepared in the apparatus of FIG. 3.

FIG. 8 shows an example of the repeat request message. The message includes a message title "Subject: Send Me," the name "Control: sendme ****" of the apparatus that made the message, and the hop counter "Hopcount: 1." The identification data of the requested information is inserted in <>.

Returning to FIG. 5, the write section 1*e* of the delivery controller 1 writes the repeat request message in the transmission area of the temporary storage unit 9 in step S25. The transmitter-receiver 8 is activated in response to the timer 12 to transmit the message in the temporary storage unit 9 to the upstream apparatus 51 in step S26.

The steps of processing a repeat request will be explained with reference to FIG. 6.

The apparatus 52 may receive a repeat request message from the downstream apparatus 54. If the storage unit 3 of the apparatus 52 has the requested information, the apparatus 52 sends the information to the downstream apparatus 54. If the storage unit 3 does not have the requested information, the apparatus 52 transfers the repeat request message to the upstream apparatus 51.

Figure 4:
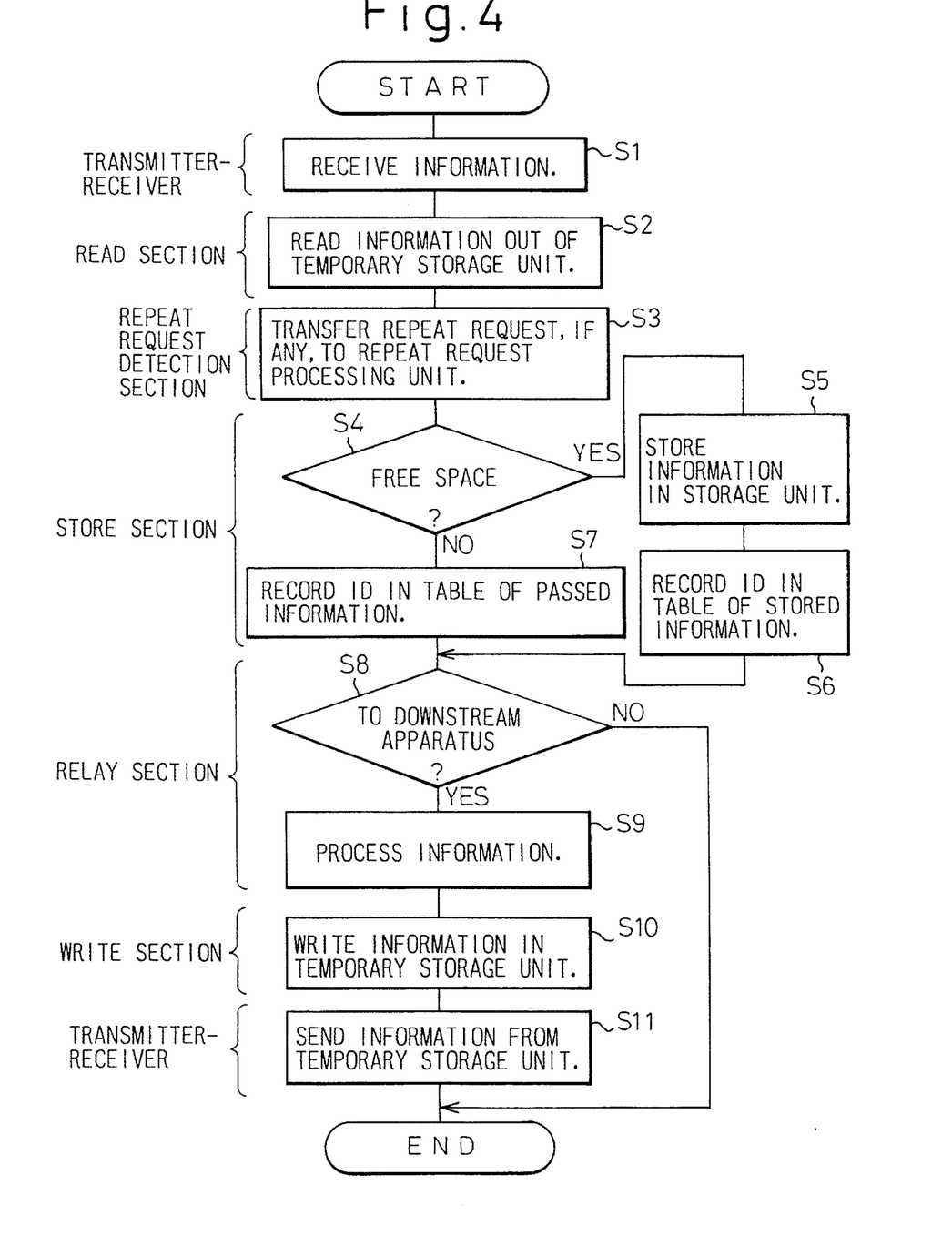
FIG. 4 shows steps of transferring information carried out in the apparatus of FIG. 3.

The repeat request processing unit 7 is activated in the step S3 of FIG. 4 by the repeat request detection section 1*b* of the delivery controller 1 when the detection section 1*b* detects a repeat request message in the reception area of the temporary storage unit 11.

Step S31 determines whether or not the identification data of the requested information is recorded in the table 6 of stored information. If it is recorded, step S32 instructs the delivery controller 1 to send the requested information to the downstream apparatus 54.

In step S33, the relay section 1*c* of the delivery controller 1 reads the requested information out of the storage unit 3. In step S34, the write section 1*e* writes the information into the transmission area of the temporary storage unit 11. In step S35, the transmitter-receiver 10 is activated in response to the timer 13, to transmit the requested information in the transmission area of the temporary storage unit 11 to the downstream apparatus 54.

If the identification data of the requested information is not in the table 6 of stored information, the repeat request processing unit 7 determines in step S36 whether or not a hop counter in the repeat request message is equal to a limit value. If it is equal to the limit value, the processing unit 7 terminates the process. If it is less than the limit value, the processing unit 7 increments the hop counter by one in step S37, and transfers the message to the delivery controller 1 in step S38. In the delivery controller 1, the write section 1e writes the message in the transmission area of the temporary storage unit 9 in step S39. In step S35, the transmitter-receiver 8 is activated in response to the timer 12 to transmit the message in the transmission area of the temporary storage unit 9 to the upstream apparatus 51.

Figure 9:
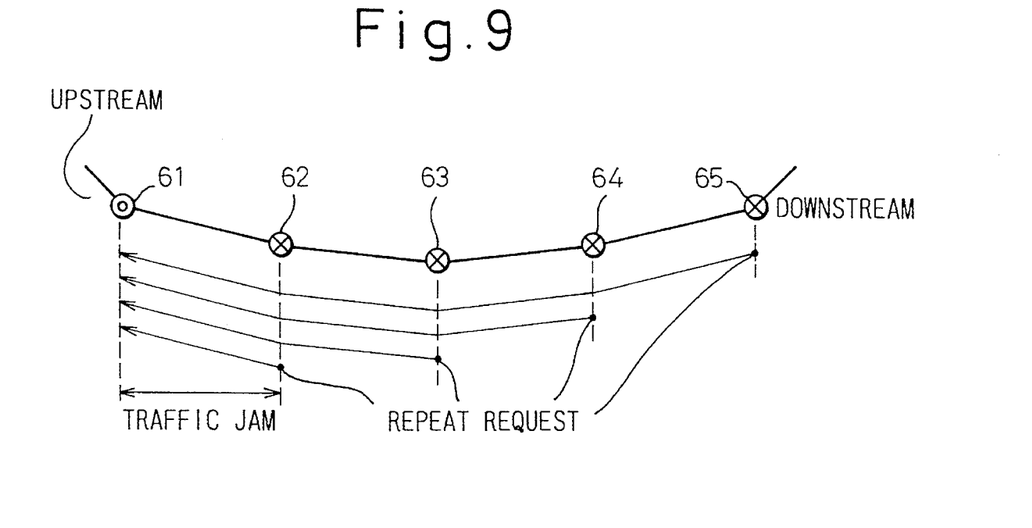
FIG. 9 shows an information delivery system without the hop counter and FIG. 10 shows an information delivery system with the hop counter.
Figure 10:
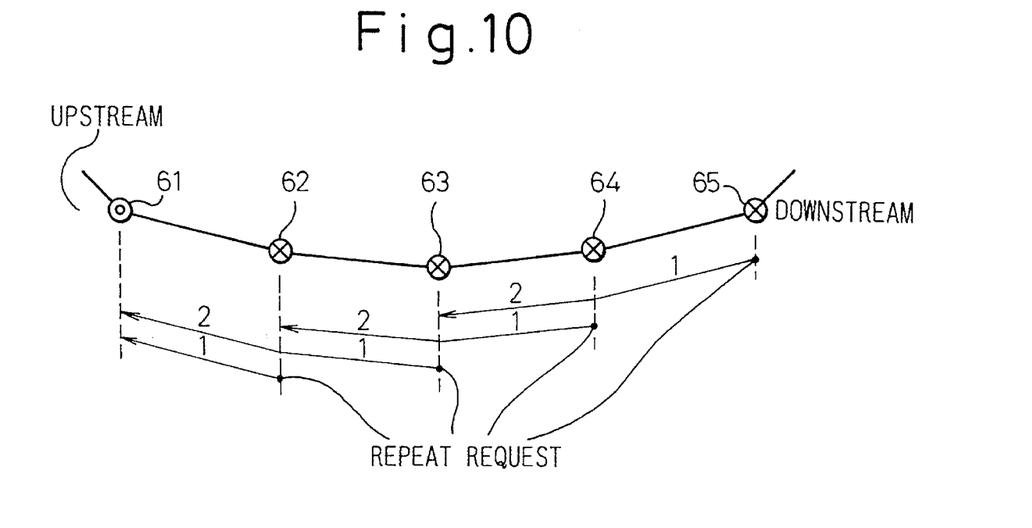

The role of the hop counter in the repeat request message will be explained with reference to FIGS. 9 and 10, in which FIG. 9 shows a system without the hop counter and FIG. 10 shows a system with the hop counter. In the figures, an upstream information delivery apparatus 61 has a free space to receive information, while information delivery apparatuses 62 to 65 have no space to receive information. Accordingly, each of the apparatuses 62 to 65 sends a repeat request to an upper apparatus thereof. As a result, the repeat requests and repeat traffic concentrate at the apparatuses 61 and 62. Then, the apparatus 62 will receive a large amount of information from the upstream apparatus 61 as soon as the apparatus 62 has a free space. This makes the apparatus 62 busy processing many pieces of information.

To solve this problem, the hop counter is arranged in each repeat request message. Whenever the repeat request processing unit 7 of any of the information delivery apparatuses receives the repeat request message, it increments the hop counter and checks the value of the counter. If the value is equal to a limit value, the processing unit 7 does not transfer the message to an upstream apparatus. This prevents traffic concentrating at a specific apparatus, as shown in FIG. 10.

In the above example, the repeat request process is simply terminated if the value of the hop counter is equal to the limit value. Instead, a message indicating that the value of the hop counter is equal to the limit value may be sent from the delivery controller 1 of the apparatus in question to the downstream apparatus that has sent the repeat request message. Then, the downstream apparatus knows that the repeat request has been ignored by the upstream apparatus and takes a proper measure of, for example, again sending the repeat request after a certain period during which the upstream apparatus may have a free space to receive the requested information.

Various modifications may be made to the present invention. For example, instead of regularly activating the transmitter-receivers 8 and 10, delivery controller 1, and repeat request unit 5 in response to the timers 12 to 15, the transmitter-receivers 8 and 10 may be activated whenever they receive information or whenever they are called by the delivery controller 1. The temporary storage units 9 and 11 may be omitted if information is transferred in real time according to, for example, an NNTP protocol of the Internet.

In the above embodiment, a given information delivery apparatus transfers a repeat request message from a downstream apparatus to an upstream apparatus if the storage unit 3 of the apparatus in question does not have the requested information. It is possible not to transfer the message to the upstream apparatus. In this case, the apparatus regularly reads the table 4 of passed information, and if there is found in the table 4 any identification data of information that must be repeated, the apparatus sends a repeat request for the information only to the upstream apparatus. This is equal to setting 1 as the limit value of the hop counter.

In the above embodiment, a given information delivery apparatus sends a repeat request message to an upstream apparatus, to receive the requested information from the upstream apparatus. However, the present invention is not limited to this case. For example, if the upstream apparatus does not send the requested information to the apparatus in question for a long time, it is possible that a downstream apparatus has the requested information. Accordingly, the apparatus in question sends the repeat request message to the downstream apparatus. In this case, the downstream apparatus sends the requested information to the apparatus in question if it has the requested information, and if not, it transfers the message to the next downstream apparatus.

As explained above, the information delivery apparatus according to the present invention transfers information provided by an upstream apparatus to a downstream apparatus even if the storage unit of the apparatus in question has no space to store the information. This prevents a delay in transferring the information. When the storage unit of the apparatus in question has a free space, the apparatus lets the upstream apparatus again send the information. Consequently, every apparatus can store all information without fail.

According to the present invention, each repeat request message has a hop counter to limit the extent of passing the message through information delivery apparatuses. The hop counter prevents traffic jam among the apparatuses.

Each information delivery apparatus according to the present invention employs temporary storage units each having a reception dedicated area and a transmission dedicated area. This arrangement prevents each temporary storage unit from being filled with delivered information alone. Even if the apparatus has no space to store information, the information is surely transferred to the next apparatus.

We claim:

1. A method of successively delivering information from an upstream information delivery apparatus to the downstream information delivery apparatus where an apparatus receives information from the upstream apparatus, stores the information, and then transfers the information to the downstream apparatus, comprising the following steps:

receiving information from the upstream apparatus;

checking whether or not a storage unit has free space to store the received information;

storing the received information in the storage unit when the storage unit has free space;

recording the identification data of the received information that has not been stored in the storage unit into a table of passed information when the storage unit has insufficient space;.

transferring the received information to the downstream apparatus even if the received information is not stored in the storage unit; and sending a repeat request message for information whose identification data is recorded in the table to the upstream apparatus when free Space is available in the storage unit.

2. The method according to claim 1, comprising the steps of:

transferring the repeat request message to the downstream apparatus instead of the upstream apparatus; and receiving the requested information from the downstream apparatus.

3. The method according to claim 1, comprising the steps of:

recording the identification data of information that has been stored in the storage unit in a table of stored information; and determining whether or not information requested by a repeat request message from the downstream apparatus is in the table of stored information, and if it is stored, sending the information from the storage unit to the downstream apparatus.

4. The method according to claim 3, comprising the steps of:

transferring the repeat request message to the downstream apparatus instead of the upstream apparatus; and receiving the requested information from the downstream apparatus.

5. The method according to claim 3, comprising the step of transferring the repeat request message from the downstream apparatus to the upstream apparatus if the identification data of the requested information is not in the table of stored information.

6. The method according to claim 5, comprising the steps of:

transferring the repeat request message to the downstream apparatus instead of the upstream apparatus; and receiving the requested information from the downstream apparatus.

7. The method according to claim 5, wherein the repeat request message has a hop counter, and comprises the steps of:

updating the hop counter when transferring the repeat request message to the upstream apparatus; and not transferring the repeat request message to the upstream apparatus if the value of the hop counter is equal to a predetermined value.

8. The method according to claim 7, comprising the steps of:

transferring the repeat request message to the downstream apparatus instead of the upstream apparatus; and receiving the requested information from the downstream apparatus.

9. An apparatus for use in an information delivery system which successively delivers information from an upstream information delivery apparatus to a downstream information delivery apparatus where the apparatus receives information from the upstream .apparatus, stores said information, and then transfers said information to the downstream apparatus, comprising:

receiving means for receiving the information from the upstream apparatus;

storage means for storing the information received from the upstream apparatus and sent to the downstream apparatus;

a table of passed information for recording identification data of information that has not been stored in the storage means;

checking means for determining whether or not the storage means has free space to store the received information;

repeat request means for preparing a repeat request message for information whose identification data are in the table of passed information and sending the message to the upstream apparatus when the checking means indicates that the storage means has the free space; and transferring means for transferring the received information to the downstream apparatus; and delivery control means for controlling the receiving means and the transferring means, storing the received information in the storage means when the checking means indicates that the storage means has free space to store the information, recording the identification data of the received information in the table of passed information without storing the received information in the storage means when the checking means indicates that the storage means has no space to store the information, and sending a repeat request message prepared by the repeat request means for the passed information to the upstream apparatus.

10. The apparatus according to claim 9, wherein the delivery control means transfers the repeat request message to the downstream apparatus instead of the upstream apparatus, and the information corresponding to a repeat request message is sent from the downstream apparatus to the upstream apparatus if the information is stored in the storage means.

11. The apparatus according to claim 9, comprising temporary storage means having a reception dedicated area and a transmission dedicated area for temporarily storing information to be received and sent, respectively.

12. The apparatus according to claim 9, wherein the delivery control means transmits the repeat request message to the downstream apparatus instead of the upstream apparatus, and information corresponding to a repeat request message is sent from the downstream apparatus to the upstream apparatus if the storage means stores the information.

13. The apparatus according to claim 9, wherein the delivery control means transfers a repeat request message from the downstream apparatus to the upstream apparatus if the repeat request processing means detects that the identification data of the requested information are not in the table of stored information.

14. The apparatus according to claim 13, wherein the delivery control means transmits the repeat request message to the downstream apparatus instead of the upstream apparatus, and information corresponding to a repeat request message is sent from the downstream apparatus to the upstream apparatus if the storage means stores the information.

15. The apparatus according to claim 13, comprising a temporary storage means having a reception dedicated area and a transmission dedicated area for temporarily storing information to be received and sent, respectively.

16. The apparatus according to claim 13, wherein the repeat request message has a hop counter, and the repeat request processing means updates the hop counter when transferring the message to the upstream apparatus and does not transfer the message to the upstream apparatus if the value of the hop counter is equal to a predetermined value.

17. An information delivery apparatus, comprising:

a first temporary storage unit temporarily storing information from an upstream apparatus;

a storage unit storing the information;

a table recording identification data of the information stored in said storage unit;

a storage capacity checker coupled to said storage unit and determining if said storage unit has free space of a predetermined volume;

a second temporary storage unit temporarily storing information to be sent to a downstream apparatus; and a delivery controller coupled to said first and second temporary storage units, receiving information from the upstream apparatus and sending the information to the downstream apparatus, and transferring the information from said first temporary storage unit to the second temporary storage unit even if the apparatus has insufficient space to store the information.

18. An information delivery system, comprising;

an upstream apparatus;

a downstream apparatus; and an information delivery apparatus coupled to said upstream apparatus and said downstream apparatus, said delivery apparatus comprising:
- a first temporary storage unit and temporarily storing information from said upstream apparatus;
- a storage unit storing the information;
- a table recording identification data of the information stored in said storage unit;
- a storage capacity checker coupled to said storage unit and determining if said storage unit has free space of a predetermined volume;
- a second temporary storage unit temporarily storing information to be sent to said downstream apparatus; and
- a delivery controller coupled to said first and second temporary storage units, receiving information from said upstream apparatus and sending the information to said downstream apparatus, and transferring the information from said first temporary storage unit to the second temporary storage unit even if the apparatus has insufficient space to store the information.

19. An information delivery system, comprising:

an upstream information delivery apparatus;

a downstream information delivery apparatus; and an intermediate information delivery apparatus coupled to said upstream information delivery apparatus and said downstream information delivery apparatus and which successively delivers information from said upstream information delivery apparatus to said downstream information delivery apparatus where intermediate information delivery apparatus receives information from said upstream apparatus, stores said information, and then transfers said information to said downstream apparatus, said intermediate information delivery apparatus, comprising:
- receiving means for receiving the information from said upstream apparatus;
- storage means for storing the information received from said upstream apparatus and sent to said downstream apparatus;
- a table of passed information for recording identification data of information that has not been stored in said storage means;
- checking means for determining whether or not said storage means has free space to store the received information;
- repeat request means for preparing a repeat request message for information whose identification data are in the table of passed information and sending the message to said upstream apparatus when said checking means indicates that said storage means has the free space; and
- transferring means for transferring the received information to said downstream apparatus; and
- delivery control means for controlling said receiving means and said transferring means, storing the received information in said storage means when the checking means indicates that said storage means has free space to store the information, recording the identification data of the received information in the table of passed information without storing the received information in said storage means when said checking means indicates that said storage means has no space to store the information, and sending a repeat request message prepared by said repeat request means for the passed information to said upstream apparatus.

* * * * *

UNITED STATES PATENT AND TRADEMARK OFFICE
CERTIFICATE OF CORRECTION

PATENT NO. : 5,611,047
DATED : March 11, 1997
INVENTOR(S) : Kenji WAKAMIYA et al.

It is certified that error appears in the above-indentified patent and that said Letters Patent is hereby corrected as shown below:

```
Col. 8,   claim 1, line 48, change "space;." to
--space;--.

Col. 9,   claim 9, line 43, change ".apparatus;" to
--apparatus,--;
          *claim 9, line 61, delete "and".

*Col. 12, claim 19, line 20, delete "and".
```

Signed and Sealed this

Nineteenth Day of August, 1997

*Attest:*

BRUCE LEHMAN

*Attesting Officer*   Commissioner of Patents and Trademarks